(12) United States Patent
Backhus et al.

(10) Patent No.: US 6,896,337 B1
(45) Date of Patent: May 24, 2005

(54) BRAKE BOOSTER

(75) Inventors: Amy Backhus, Granger, IN (US);
Steve E. Villaire, Elkhart, IN (US);
Mark LaCosse, Granger, IN (US);
Walter Last, Mishawaka, IN (US)

(73) Assignee: Robert Bosch Corporation, Broadview, IL (US)

( * ) Notice: Subject to any disclaimer, the term of this patent is extended or adjusted under 35 U.S.C. 154(b) by 30 days.

(21) Appl. No.: 10/645,206

(22) Filed: Aug. 21, 2003

Related U.S. Application Data (63) Continuation-in-part of application No. 10/108,742, filed on Mar. 28, 2002, now abandoned.

(51) Int. Cl.$^7$ .............................. B60T 8/34; B60T 8/44
(52) U.S. Cl. ................................. 303/114.3; 303/113.4
(58) Field of Search .......................... 303/114.3, 113.4; 188/355, 356, 357; 60/545, 547.1; 91/369.1, 369.2, 369.3, 376 R (56) References Cited

U.S. PATENT DOCUMENTS

| | | | | |
|---|---|---|---|---|
| 5,586,814 A | * | 12/1996 | Steiner .................... | 303/116.2 |
| 6,033,039 A | * | 3/2000 | Dieringer ................ | 303/114.3 |
| 6,375,282 B1 | * | 4/2002 | Inoue et al. .............. | 303/191 |

FOREIGN PATENT DOCUMENTS

| JP | 2000-313330 A | * | 11/2000 | ........... B60T/17/18 |
|---|---|---|---|---|

* cited by examiner

*Primary Examiner*—Robert A. Siconolfi
(74) *Attorney, Agent, or Firm*—Leo H McCormick, Jr.; Warren Comstock (57) ABSTRACT

A brake booster having a housing is separated into a first chamber and a second chamber by a wall connected to a hub. The hub has a cylindrical body with an axial bore that retains a control valve for sequentially connecting the first chamber with the second chamber to provide for the equalization of fluid pressure therein to define a first mode of operation and interrupting communication between the first and second chambers while connecting the second chamber to a surrounding environment to allow air to enter into the second chamber and create a pressure differential across the wall to defining a second mode of operation. The pressure differential acts on the wall to develop an output force that pressurize fluid to effect a brake application. The brake booster is characterized by a first input member responsive to a manual input and a second input member responsive to an ECU for moving the control valve from the first mode to the second mode to respectively develop first and second brake applications. A switch carried by the hub is activated during the second brake application to provide the ECU with a first signal confirming the development of the second brake application while an input force applied to the first input member deactivates the switch and provides the ECU with a second signal to terminate the second brake application and place the development of first brake application under the control of an operator.

9 Claims, 7 Drawing Sheets

BRAKE BOOSTER

This is a continuation-in-part of U.S. patent application Ser. No. 10/108,742 filed Mar. 28, 2002 now abandoned.

This invention relates to a vacuum brake booster with an automatic mode of operation under the control of an electronic control unit and a manual mode of operation under the control of an operator input force having switching means that provides for an immediate transfer from the automatic mode to the manual mode of operation.

BACKGROUND OF THE INVENTION

Vacuum brake booster having a manual mode of operation and an electronic mode of operation is known in the prior art as evidenced by structure disclosed in U.S. Pat. Nos. 4,778,225; 5,096,267; 5,176,433 and 5,312,173 relating to the addition of traction control to a brake system and U.S. Pat. Nos. 5,226,173; 5,845,558; 5,772,290 and 6,065,388 relating to emergency braking features for a brake system. The structure in such brake systems functioned in an adequate manner for a purposed purpose at the time of such inventions however with the introduction of sway control features to a brake system such brake systems did not operate in a manner to provide for acceptable control of a brake system by an operator. For instance in some of the brake boosters having an emergency braking features, once an emergency brake application was initiated, the operator was prevented from intervening in the brake application unless the input force that initiated the emergency brake application was removed from a brake pedal. In U.S. Pat. Nos. 5,556,173 and 6,375,282 specific software and a switch are activated by a brake light switch to terminate an automatic braking.

SUMMARY OF THE INVENTION

In the present invention the structure for a vacuum brake booster overcomes a shift in control disadvantage in the brake boosters used in prior brake systems by providing for an immediate transfer from an electronic actuation of a control valve to a manual actuation of the control valve to provide for continuity in a brake application.

According to this invention, a brake booster has a housing with an interior separated into at least a first chamber and a second chamber by a wall connected to a hub. The hub has a cylindrical body with an axial bore therein that retains a control valve for sequentially connecting the first chamber with the second chamber to provide for the equalization of fluid pressure therein to define a first mode of operation and interrupting communication between the first and second chambers while connecting the second chamber to a surrounding environment to allow air to enter into the second chamber and create a pressure differential across the wall to defining a second mode of operation. The pressure differential acts on the wall to develop an output force that is communicated through the hub as an output force to move pistons located in a master cylinder and pressurize fluid that is communicated to wheel brakes to effect a brake application. The brake booster is characterized by a first input member defined by a brake pedal and input push rod that is connected to the control valve and responsive to an input force applied to the brake pedal for moving the control valve from the first mode to the second mode to develop a corresponding first brake application and a second input member defined by a solenoid connected to the control valve that responds to an electrical input under the control of an electronic control unit (ECU) by moving the control valve from the first mode to the second mode to develop a corresponding second brake application. On movement of the control valve by solenoid to the second mode, the hub initially moves while the push rod remains stationary to activate a switch such that a first signal is sent to the ECU confirming the development of the second brake application. Should the operator thereafter desire to implement a manual brake application and override the brake actuation under the control of the ECU, an input force is applied to the brake pedal to move the input push rod and deactivate the switch such that a second signal is sent to the ECU that terminates the electrical input to the solenoid and immediately initiates the development of the first brake application.

An advantage of this invention resides in the switch member whereby the operation of a vacuum brake booster transitions from an automatic actuation by a solenoid acting on a control valve to a manual actuation without loss of continuity.

An object of this invention is to provide a vacuum brake booster with a switch arrangement whereby a first signal is provided to an ECU to indicate the development of an automatic brake application on movement of a control valve by actuation of a solenoid member and a second signal is provided to the ECU to termination of the actuation of the solenoid valve and immediately initiate control of control valve by an operator to effect a manual brake application.

DETAILED DESCRIPTION

Figure 1:
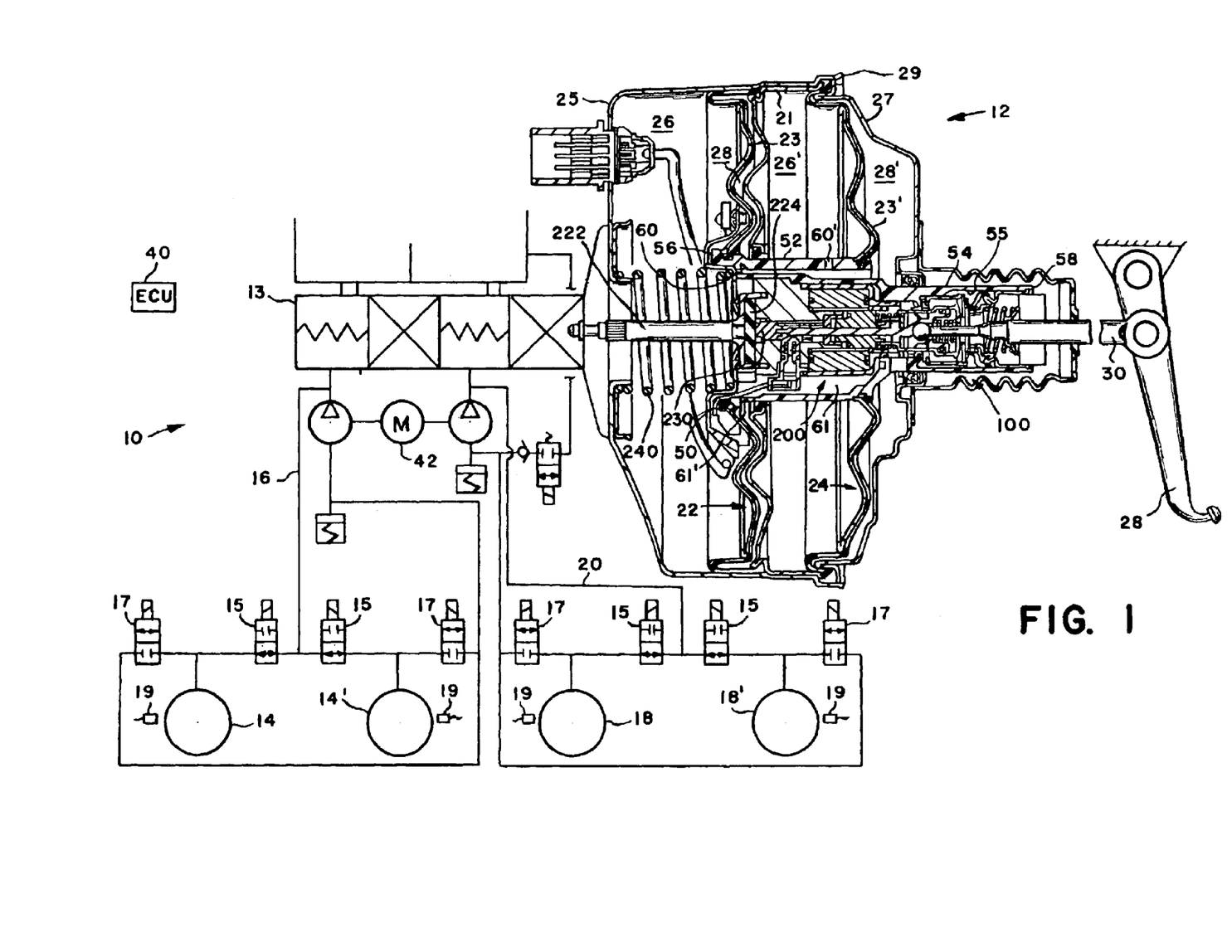
FIG. 1 is schematic illustration of a brake system with a vacuum brake booster made according to the teachings of the present invention.

The brake system 10 as shown in FIG. 1 includes a vacuum brake booster 12, made according to the present invention, for supplying a master cylinder 13 with an operational force to pressurized fluid that is supplied to a first set of wheel brakes 14,14' by a first conduit 16 and to a second set of wheel brakes 18,18' by a second conduit 20 to effect a brake application. Vacuum brake booster 12 is similar to a type of brake booster disclosed in U.S. Pat. No. 6,327,958 in that a manual force applied is through a brake pedal 28 to move an input rod assembly 30 that is connected operated control valve 100 and to develop an operational force for effecting a first brake application but differs in that a solenoid 200 acts in response to a signal received from an electronic control member (ECU) 40 to provide for independently actuation of the control valve 100 and automatically and independently effect a second brake application.

The second brake application is exclusively under the control of the ECU 40 and uses structure associated with a wheel lock assembly in the brake system 10 to selectively provide individual wheel brakes with pressurized fluid to achieve braking. The use of the wheel lock assembly which is designed to attenuate the rotation of a wheel when rolling on a surface and decelerating from a first speed to a second speed when locking may occur during a brake application has been expanded and is also utilized to provide for traction control and sway control features for the brake system 10.

The wheel lock assembly as illustrated in FIG. 1 includes among other components: an electric motor pump 42; and a build solenoid valve 15, a decay solenoid valve 17, and a wheel speed sensor 19 for each wheel in the first set of wheel brakes 14,14' and in the second set of wheel brakes 18,18'. The wheel speed sensor 19 for each wheel provide the electronic control unit (ECU) 40 with input signals to provide current information or data relating to the functional operational of the vehicle. The ECU 40 also receives and evaluates other signals relating to the current operation of the vehicle including but not limited to: the operation of the motor pump 42; the pressure of the pressurized supply fluid; dynamic forces experienced by the vehicle; accumulator fluid supply pressure; the level of fluid in a reservoir; deceleration and deceleration forces and other inputs that relate to the operation of the vehicle and may effect the safe operation of a vehicle.

Figure 2:
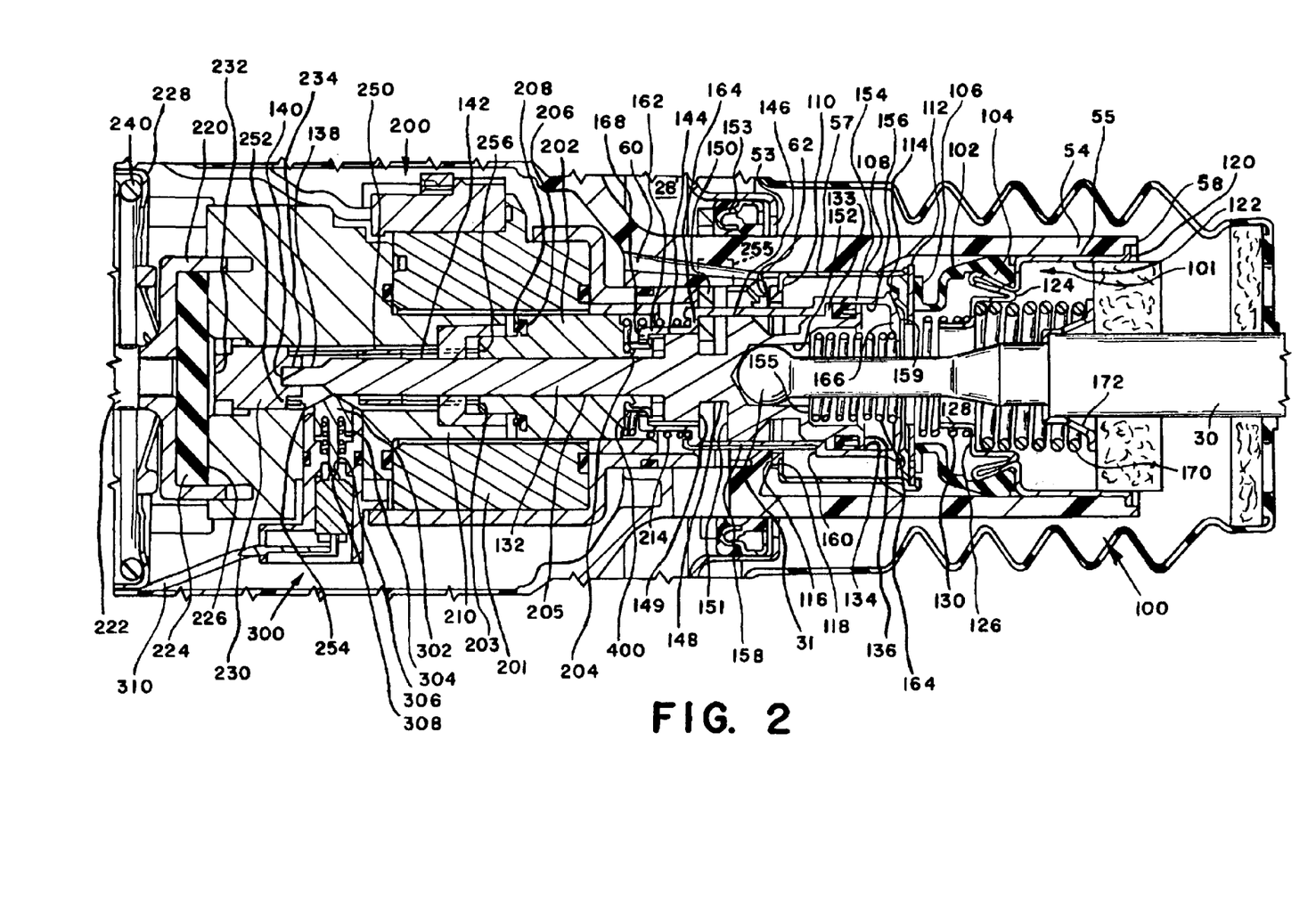
FIG. 2 is an enlarged sectional view of the hub and control valve of FIG. 1.

The vacuum brake booster 12 illustrated in FIGS. 1 and 2 includes a housing that is formed by joining a front shell 25 to a rear shell 27 through a locking arrangement 29. A partition arrangement 21 similar to a type disclosed in U.S. Pat. No. 3,897,718, is located in the housing and connected to a hub 50 while movable walls 22 and 24 separate the interior of the housing into front 26,26' and rear 28,28' chambers. The movable walls 22 and 24 each have a correspondingly diaphragm and backing plate assembly 23,23' that are fixed to the peripheral surface 52 of hub 50. The hub 50 has a cylindrical body 54 with stepped axial bore 55 that extends from a first end 56 located in the front chamber 26 to a second end 58 which passes through the rear shell 16 and is located in a surrounding environment. Hub 50 has a first series of passageways 60,60' through which the front chambers 26,26' are permanently connected to each other upstream of a vacuum seat 62 and a second series of passageways 61,61' through which the rear chambers 28,28' are selectively connected to each other downstream of vacuum seat 62 located in the cylindrical body 54 on movement of the control valve 100 by either a manual input from brake pedal 28 defined as a first input member or automatically by solenoid 200 defined as a second input member.

The control valve 100 includes a poppet assembly 101 and associated plunger member 132 that respond to an input from push rod assembly 30 associated with brake pedal 28 or solenoid 200 to initiate the development of a actuation force that pressurizes fluid in the master cylinder 13 and effect a brake application.

The poppet assembly 101 has a flexible tubular section 102 and a collar assembly 108. The tubular section 102 has a bead 104 on a first end that is secured to the cylindrical body 54 and a lip 106 on a second end while the a collar assembly 108 has a flange 110 on a first end and a second end that is crimped onto the second end of the flexible tubular section 102 to define a unitary member. The second end of the flexible tubular section also has a washer 112 around which lip 106 is integrally molded to provide for support for a first annular surface 114 on the lip 106. The first annular surface 114 defines an atmospheric seat for the poppet assembly 101. The peripheral surface of the collar assembly 108 engages a plurality of ribs 57(only one is shown) that axially extend from vacuum seat 62 on the cylindrical body 54 toward end 58 to assist in axially aligning the poppet assembly 101 within axial bore 55 and in particular align face 118 on an annular rubber ring 116 attached to flange 110 in perpendicular alignment with vacuum seat 62 in the stepped bore 55.

The poppet assembly 101 is positioned in the stepped axial bore 55 of the cylindrical body 54 by a retainer 120. The retainer 120 has a first cylindrical body 122, with a first surface 124 that engages and holds bead 104 of the tubular section 102 against the cylindrical body 54 to seal passageways 60,60' from the surrounding environment, that is connected by a shoulder 126 to a second inner concentric cylindrical body 128. A spring 130 that is located between shoulder 126 and washer 112 provides a force that constantly urges the face 118 on collar assembly 108 toward vacuum seat 62 in the cylindrical body 54.

The plunger member 132 has a cylindrical body with a plurality of diameter surfaces that engage other to hold and align the plunger member 132 within the axial bore 55. A first diameter 134 of the cylindrical body is located adjacent a first end 136 and forms a base while a second diameter 138 is located adjacent a second end 140 and forms a contact surface for a switch 300 that is connected to the ECU 40. The second diameter 138 transitions into a third diameter 142 that extends to a fourth diameter 144 that is separated from a fifth diameter 146 by a groove 148. The groove 148 forms a slot for receiving key 150 of a type disclosed in U.S. Pat. No. 4,953,446, that extends through cylindrical body 54 to retain the plunger member 132 within the axial bore 55. The cylindrical body has a stepped bore 152 that extends from the first end 136 for receiving and retaining a head 31 on a push rod assembly 30 of the first input member.

A cylindrical member 154, which functions as a valve seat, is located in axial bore 55 and has a first diameter section 156 that is separated from an intermediate second diameter section 158 by a shoulder 160 while the second diameter section 158 is separated from a third diameter section 162 by a shoulder 164. An annular surface 166 that extends inwardly from the end of the first diameter section 156 to define a face 159 that is adapted to mate with atmospheric seat 114 formed on lip 106 of the flexible tubular section 101 of the poppet member 102. Similarly an inwardly projecting lip 168 extends from the end of the third diameter section 162 to define an engagement surface for linkage 400. The cylindrical member 154 surrounds the plunger member 132 and engages corresponding surfaces thereon such that the first diameter surface 134 on the plunger member 132 sealingly engages the first diameter section 156 to prevent air from the environment from being communicated there between into the rear chambers 28,28'. The second diameter section 158 has slots (not shown) that correspond to slots in the cylindrical body 54 that allow key 150 limited axially movement with respect to the cylindrical body 54 such that on engagement with stop 153 defined by a seal located in opening 53 in the rear shell 27, face 118 on collar 108 is positioned at a desired distance or gap with respect to vacuum seat 62. A spring 164 located between a shoulder 157 in stepped bore 152 and annular surface 166 urges rib 133 on the first diameter surface 134 of plunger member 132 into engagement with shoulder 160 on the cylindrical member 154 and face 159 toward the atmospheric seat 114 formed on lip 112 of the poppet assembly 102.

A spring 170 is located between shoulder 126 on retainer 120 and a clip member or shoulder 172 on push rod assembly 30 acts on the push rod assembly 30 to bring surface 149 of groove 148 in plunger member 132 into engagement with key 150 and thereby position the plunger member 132 in a rest position of rest as illustrated in FIGS. 1 and 2 wherein the first chamber 26,26' are connected to the rear chambers 28,28' such the pressure therein is equalized.

The second input member 200, in addition to solenoid 201, further includes a plunger 202 that is located in axial bore 55. Plunger 202 has an axial bore 205 through which diameter 142 of the shaft of plunger member 132 passes and a lip 204. A annular groove 206 on a first face 203 of plunger 202 receives a rubber ring 208 which acts as a bumper to attenuate any noise that may be generated on engagement of plunger 202 with guide 210 retained in bore 55 of hub 50. The lip 204 on plunger 202 and lip 168 that extends from the third diameter section 162 of cylindrical member 154 are joined together by linkage 400 such that plunger 202 is connected to the annular surface 166 and face 159 that along with annular seat 114 functions to control communication of air from the environment to the rear chambers 28,28". A spring 214 located between shoulder 164 and the end of plunger 202 acts to position the plunger 202 within the force field of solenoid 200 such that on receipt of electrical current from ECU the plunger 202 moves toward a centering position with respect to coil 207.

A guide 210 is positioned in axial bore 55 and receives head or cup 220 on an output push rod 222. The cup 220 retaining reactions disc 224 that is positioned against surface 226 on guide 210. A retainer 228 of a type disclosed in U.S. Pat. No. 6,302,001 is engages head 220 such that return spring 240 urges the hub 50 toward the position of rest as illustrated in FIG. 1. A reaction plate 230 located in guide 210 has a face 232 located adjacent the reaction disc 224 and an axial bore 234 for receiving diameter 138 on the second end 140 of plunger member 132. A sleeve member 250 having a plurality of slots 254 (only one is illustrated in conjunction with plunger 302) has a first end 252 that engages reaction plate 230 and a second end 256 that engages a face 203 on plunger 202 to provide a reaction feedback derived by a reaction force developed in reaction disc 224 to oppose the movement of the plunger 202 and correspondingly an output force developed by actuation of the second input member.

The switch 300 is retained in guide 210 and has a plunger 302 that is urged toward diameter surface plunger 132 by a spring 304. In particular, when the hub 50 is located in its position of rest as illustrated in FIGS. 1 and 2, plunger 302 engages diameter surface 142 of plunger member 132 such that contact surface 306 engages a contact surface 308 on lead 310. Lead 310 is connected with ECU 40 to provide an input corresponding to the position of plunger member 132 in axial bore 55 of cylindrical member 54. The switch 300 is shown as being a contact type but could also be of a type activated by an electrical magnetic that would not require actual engagement of the contact surfaces.

Figure 5:
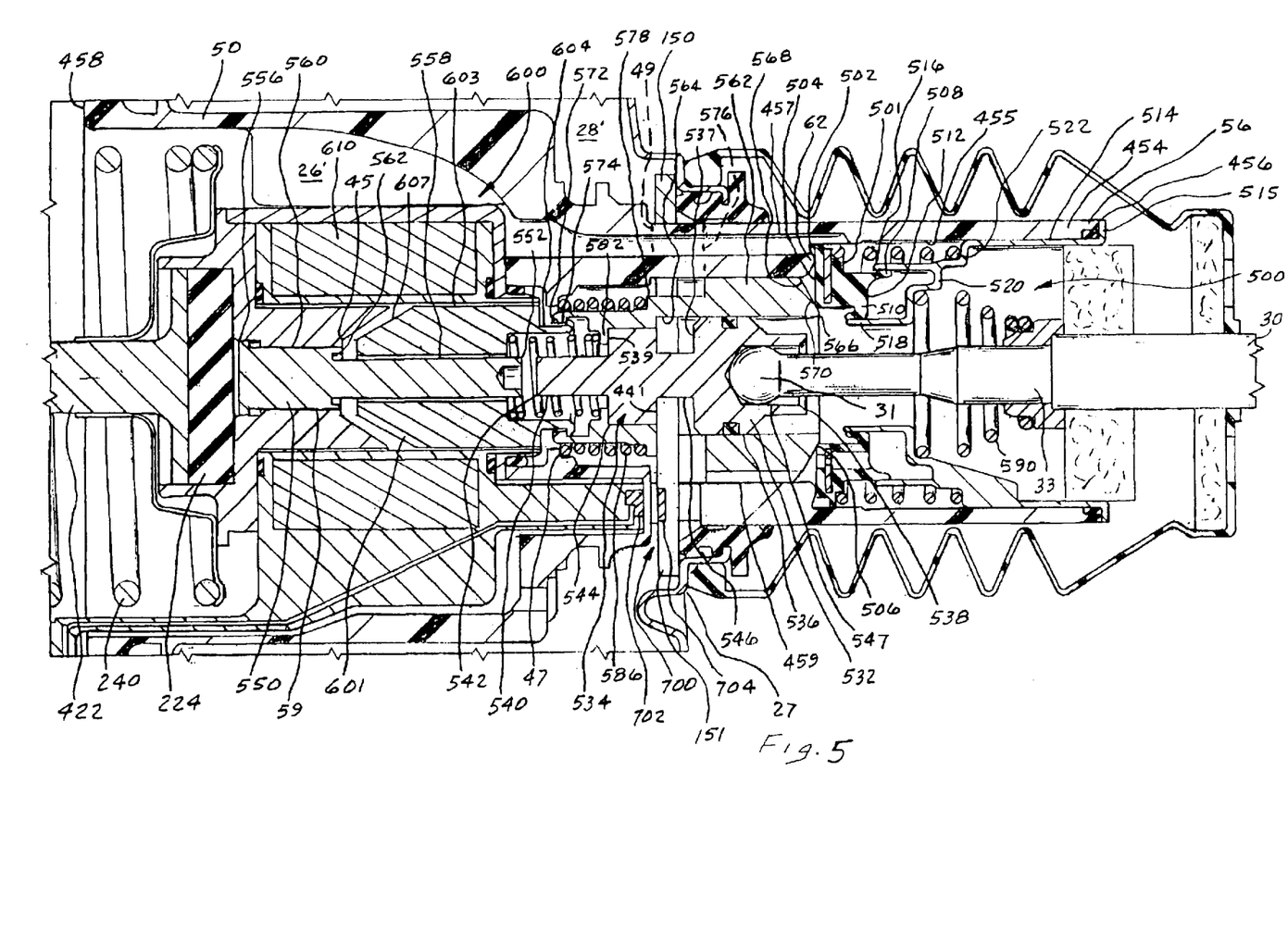
FIG. 5 is a sectional view of a second embodiment of a hub and control valve for a vacuum brake booster made according to this invention.

A second brake booster 12A is illustrated in FIG. 5. Brake booster 12A is defined by a housing having an interior separated into a first chamber 26,26' and a second chamber 28,28' by a wall 21 connected to a hub 50. The hub 50 has a cylindrical body 454 with an axial bore 455 that extends from a first end 456 to a second end 458. A control valve assembly 500 is located in the axial bore 455 for sequentially connecting the first chamber 26,26' with the second chamber 28,28' through a first passage 457 to provide for the equalization of fluid pressure between the chambers during a first mode of operation and for interrupting communication through the first passage 457 while connecting the second chamber 28,28' to the surrounding environment through a second passage 459 to allow air to enter the second chamber 28,28' and create a pressure differential across the wall 21 in response to an operational signal during a second mode of operation. The pressure differential acts on the wall 21 and after overcoming the force of a return spring 240, develops an output force that is applied through hub 50 and reaction disc 224 to move pistons located in master cylinder (13) and pressurize fluid therein that is communicated to wheel brakes 14,14',18,18' to effect a brake application.

The brake booster 12A is functional through either a first input member 30 or a second input member 600 that are connected to the control valve assembly 500. The first input member 30 is responsive to an operator input for moving the control valve assembly 500 from the first mode of operation to the second mode of operation to develop the first brake application while the second input member 600 under the control of an ECU 40 for moving the control valve assembly 500 from a first mode of operation to a second mode of operation to develop a second brake application. When the control valve assembly 500 is under the control of the ECU, switch means 700 retained in hub 50 provides the ECU 40 with an initial first signal confirming the development of a second brake application. Should an operator later desire to effect a first brake application, switch means 700 provides the ECU 40 with a second signal on movement of the control valve assembly 500 by first input member 30 whereby electrical input to the second input member 600 is terminated and the operation of the vacuum brake booster 12A is responsive to a manual input applied to the first input member 30.

In more detail, the control valve assembly 500 is defined by a cylindrical member 501 that functions as a poppet and is sealingly located in the axial bore 455 of cylindrical body 454 of hub 50, the cylindrical member 501 has an annular face 502 on a first end 504 with a portion thereof that functions as an atmospheric seat 506 and first 508 and second 510 flexible radial lips that extend from a second end 512;

a retainer 514 has a body 515 that is fixed to the end 56 of the cylindrical body 454 of hub 50 with a first annular cylindrical surface 516 that is separated from a concentric second annular cylindrical surface 518 by a shoulder 520. The first lip 508 on cylindrical member 502 sealingly engages cylindrical surface 516 and the second lip 510 on the cylindrical member 502 sealingly engages cylindrical surface 518 on retainer 514 to hold face 502 in a perpendicular alignment with the axial bore 55 of hub 54;

a first spring 522 is located in axial bore 455 between a shoulder on retainer 514 and cylindrical member 501 to urge the annular face 502 thereon toward a seat 62 associated with a first passage 53 in hub 50 through which chamber 26 is connected to chamber 28 by way of axial bore 55;

a first plunger 532 is located in axial bore 455 of hub 50 and includes a first shaft 534 and a second shaft 550. The first shaft 534 has a first land or diameter 536 adjacent a first end 538, a second land or diameter 540 adjacent a second end 542 with third land or diameter 544 is located there between to define a groove 546 between the first land 536 and third land 544. End 538 of the first shaft 534 has a bore 547 for receiving a head 31 on a push rod 33 of the first input member 30 while end 542 has a flat surface for engaging the second shaft 550. The second shaft 550 has as first end 552 and a second end 556 with a peripheral surface having a first diameter 558 separated from a second diameter 560 by a shoulder 562. The second diameter 560 engages a bearing surface 59 in hub 50 to hold the second end 556 in alignment with reaction disc 224 and the first end 552 in axial alignment with the second end 542 on the first shaft 534;

a second cylindrical member 562 is located in axial bore 454 and includes a stepped bore 564 that surrounds the first 536 and third 544 diameters of the first shaft 534 with a first end 566 that has a tapered face 568 thereon to define an atmospheric or second seat 570 while a second end 572 has a lip 574 thereon. The cylindrical member 562 further includes a radial slot 576 that is located between a first shoulder 578 and a second shoulder 580, the radial slot 576 has a linear length the larger than a radial slot 49 in the cylindrical body of hub 54 plus a length defined by a lap gap for the control valve assembly 500 and an internal rib 582 located in the stepped bore 564 adjacent the second end 572 that functions as an abutment surface for shoulder 539 on the first plunger 532 through which the first input force is applied to move the second cylindrical member 562;

a second spring 586 is located in axial bore 455 and has an end that engages surface 47 in hub 50 and an end that engages shoulder 578 on the second cylindrical member 562 for urging the first end 566 and associated tapered atmospheric seat 570 of the second cylindrical member 562 toward the annular face 502 on the first cylindrical member 501;

a key 150 that is retained in cylindrical body 454 of hub 50 has first and second legs 151 (only one is shown) that extend through slots 49,49' in cylindrical body 454, through slots 576,576' in the second cylindrical member 562 and groove 546 in the first plunger 532. The slots 49,49' in cylindrical body 454, slots 576,576' in the cylindrical member 562 and groove 546 limit the axial movement of the first plunger 532 in axial bore 55.

a third spring 590 is located in axial bore 55 between shoulder 520 on retainer 514 and push rod 31 for urging the first plunger 532 toward retainer 514. In the first mode of operation, return spring 240 acts on hub 50 and when key 150 engages the rear shell 27, face 441 on the third land 438 of the first plunger 432 engages key 150 to hold the first plunger 432 in a stationary position while the cylindrical body 454 continues to move by way of slots 49,49' until the bottom of slot 49,49 engages key 150 at which time the second spring 586 will have moved the tapered atmospheric seat 570 into engagement face 502 on the first cylindrical member 501 such that the first chamber 26,26' is connected with second chamber 28,28'. Thus, the atmospheric seat 570 is resiliently retained on face 502 while the force of the third spring 590 is selected such a gap may be present between face 502 on the first cylindrical member 501 and the vacuum seat 62.

a second plunger 601 which is part of the second input member 600 has a cylindrical body 603.which is located in the axial bore 454 and loosely surrounds diameter 558 on the second shaft 550. The cylindrical body 603 has a groove 604 on a first end for receiving lip 574 on the second cylindrical member 562 to form a link that secures the second plunger 601 with the second cylindrical member 562. The cylindrical member 603 has a tapered end that is designed to engage as stop 45 in the hub 50 to limit the axial movement of the second cylindrical member 462 within the axial bore 454;

a solenoid 610 retained in hub 50 has a coil that is concentric to the cylindrical body 603 of the second plunger 601. The coil of solenoid 610 is connected to the ECU 40 and on receipt of an electrical input indicating a traction control event is desirable to control the vehicle operation, a force is produced by the electric current attempting to center the cylindrical body 603 within the coil such that second cylindrical member 462 and its atmospheric seat 570 correspondingly move away from face 502 on the first cylindrical member 501. After face 502 is seated on vacuum seat 62 communication through passage 53 is terminated to the second chamber 28 and thereafter air is allowed to be communicated to the second chamber 28 through the second passage to initiate the second mode of operation and a brake application; and a switch 700 including a sensor 702 is retained in hub 50 and an exciter element 704 attached to key 150. The sensor 702 is of a passive type such as a Hall effect, AMR or GMR device that is activated by a magnetic field coupling while the exciter element 704 is a magnet. A change in a relationship between the sensor 702 and exciter element 704 defining a signal that is communicated to the ECU 40. During a first brake application resulting from a manual input being applied to the first plunger 432, the relationship between the sensor 702 and exciter 704 does not have any effect in effecting a brake application. However should the ECU 40 determine that a vehicle operation may be enhance through a second brake application when an electrical input is provided to solenoid 610 to operate the control valve assembly 500, the sensor 702 is also activated. When the second plunger 601 moves the second cylindrical member 562 such that atmospheric seat 570 is away from face 502 and a pressure differential acts on wall 40 to move hub 50 on initial movement sensor 702 moves away from exciter 704 to supply the ECU 40 with a signal indicating that a second brake application has been initiated. In this second brake application, key 150 remains against the rear of slot 49,49' as the return spring 590 acts on input push rod 33 to hold the first plunger 432 against key 150 and as a result the first plunger 432 remains stationary with respect to the cylindrical body 454 and the relationship between the sensor 702 and exciter 74 remains constant during this second brake application. The second brake application remains in effect and under the control of the ECU until sensor associated with measuring the operation of the vehicle indicate a safe operation may be achieved. Should an operator desire to effect a first brake application during this second brake application, a manual input applied to push rod 33 overcomes the force of spring 590 and moves face 537 on the land 536 into engagement with key 150 and thereafter moves key 150 in slot 49,49 to position exciter 704 adjacent sensor 702 to create a second signal that is communicated to the ECU 40 indicating an operator desires to take control of the braking of the vehicle. Once the ECU 40 receives this second signal, the electrical input to the coil of the solenoid 610 is immediately terminated and the braking of the vehicle is under the control of the first input member as a function of the force applied to the input push rod 33.

Mode of Operation

Figure 3:
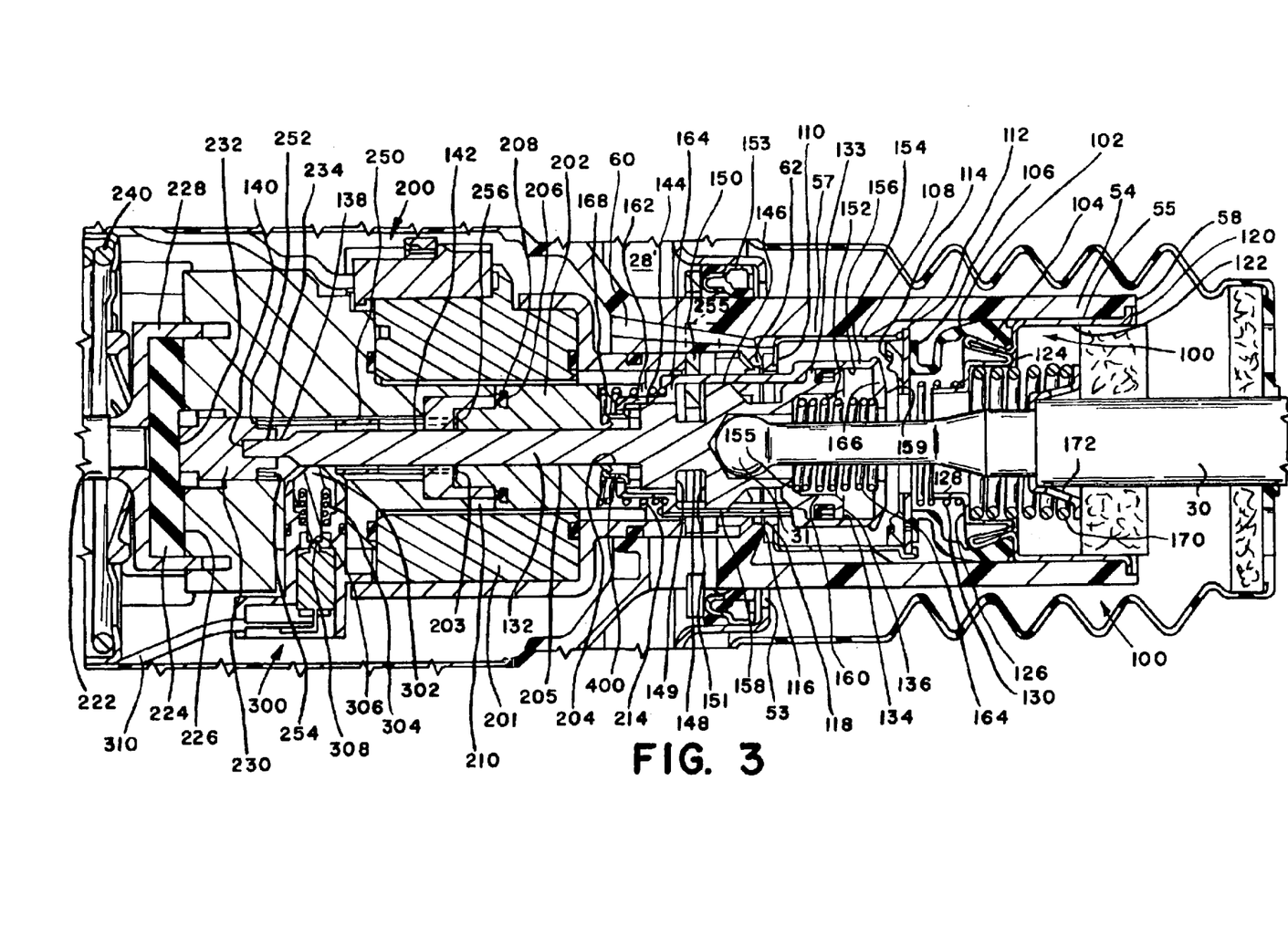
FIG. 3 is an enlarged sectional view of the control valve of the brake booster of FIG. 1 in a power assist mode of operation in response to a manual input.

In FIGS. 1 and 2, the vacuum brake booster 12 for brake system 10 is illustrated in a position of rest. For an operator to effect a brake application to reduce the speed or stop a vehicle, an input force is applied to brake pedal 28 that moves push rod assembly 30 in a linear manner to move plunger member 132. Initial movement of plunger member 132 allows spring 130 to act on and move collar 108 such that face 118 engages vacuum seat 62 to seal the second or rear chambers 28,28' from the first or front chambers 26,26' as illustrated in FIG. 3. Further movement of plunger member 132 moves face 159 on annular surface 166 away from seat 114 to allow air to enter into axial bore 55 and be communicated to the rear chambers 28,28'. With air in the rear chambers 28,28' and vacuum in the front chambers 26,26', a pressure differential is created across walls 22,24 such that a force is produced and transmitted into hub 50. The force received by hub 50 is applied to output push rod 222 through reaction disc 224 for moving pistons in master cylinder 13 to effect a brake application as a function of the input force applied to the brake pedal 28. The force communicated through the reaction disc 224 acts on reaction plate 230 and is proportionally carried through plunger member 132 to oppose the input force applied by the operator through the input push rod assembly 30. Once a brake application has been completed to the satisfaction of an operator and the input force applied to brake pedal 28 is removed, return spring 240 acts on hub 50 to move the walls 22,24 to the position of rest. At the same time valve return spring 170 acts on push rod assembly 30 to move plunger member 132 with respect to cylindrical member 54 such that surface 149 engages key 150 and spring 164 acts on annular surface 166 to bring face 159 into engagement with seat 114 to terminate communication of air to the rear chambers 28,28'. On engagement of face 159 with seat 114, the return spring 170 moves plunger member 132 in slots 155 in the cylindrical member 54 such that the poppet assembly 101 is moved away from vacuum seat 62 and air is evacuated from the rear chambers 28,28' by vacuum in the front chambers 26,26' to equalize the pressures there between. As the wall 22,24 approaches the position of rest, key 150 engages stop 153 to interrupt the rearward movement of the push rod assembly 30, however the hub 50 continues to move a distance defined by the slot 155 therein to position face 118 adjacent vacuum seat 62 and bring the components in the control valve 100 into a position for a next brake application. In this manual brake application, the plunger 302 on switch 300 remains on diameter 142 and provides a signal to the ECU 40 that a brake application is under the manual control of an operator.

During the operation of the vehicle, the ECU 40 receives information from the wheel speed sensors 19 and many other sensors in the vehicle such as: differential wheel speed of the wheel during acceleration, sway of the vehicle with respect to a horizontal plane; the operation of the motor pump 24; the pressure of the pressurized supply fluid, dynamic forces experienced by the vehicle; fluid supply pressure in accumulator, the level of fluid in a reservoir and etc., all inputs which relate to the operation of the vehicle and may effect a brake application. The ECU 40 evaluates and analyzes the information or data relating to a current functional operational of the vehicle which may effect a safe operation thereof and if certain conditions exceed set limits, the ECU 40 independently operates the vacuum brake booster 12 to provide master cylinder 13 with a force to pressurize fluid that is selectively supplied to a wheel brake or wheel brakes to effect a brake application thereof and reduce or at least attenuate the sensed conditions to a safe level of operation of the vehicle.

Figure 4:
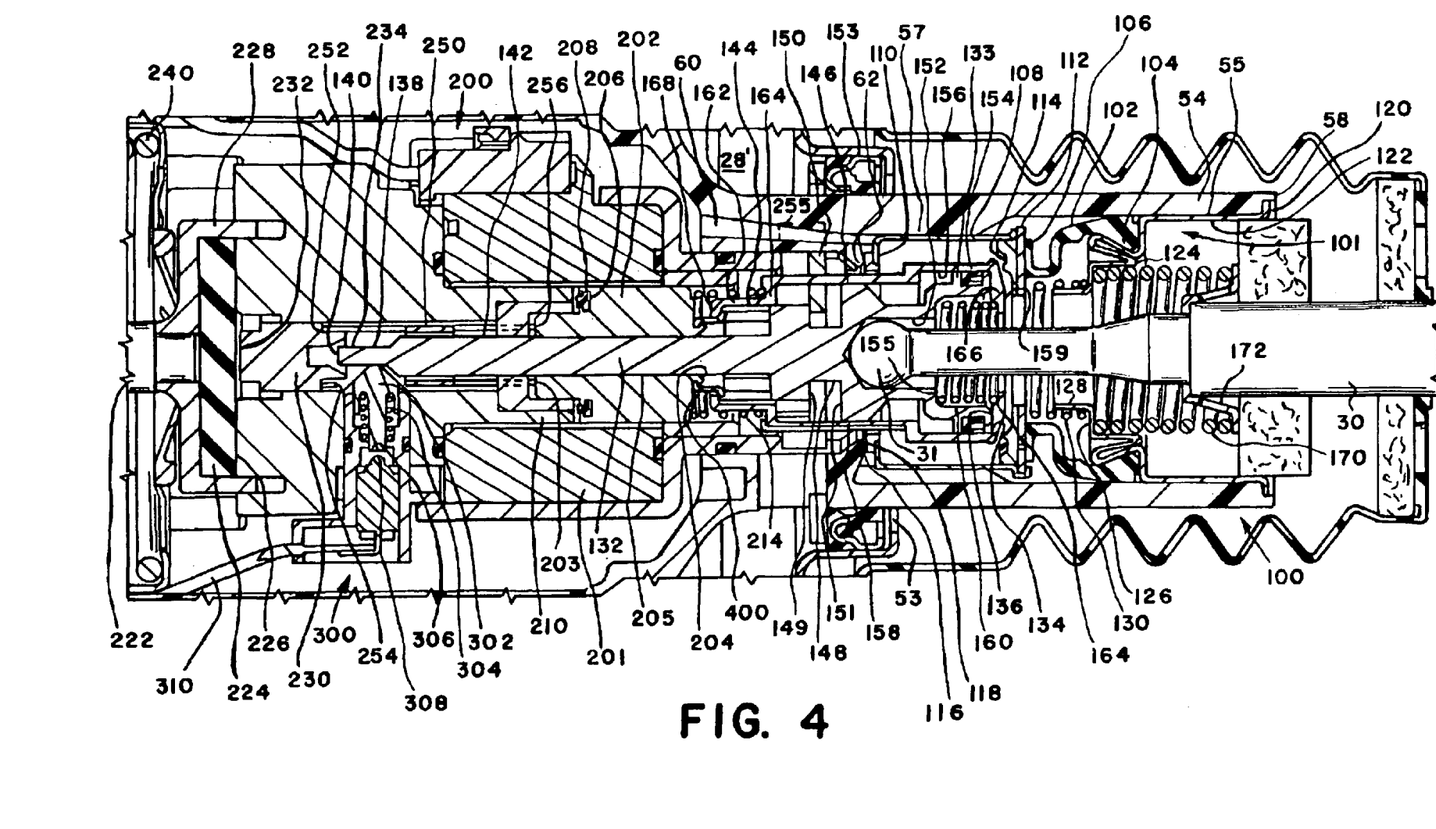
FIG. 4 is an enlarged sectional view of the control valve of the brake booster of FIG. 1 in an automatic mode of operation under the control of an Electronic Control Unit.

The ECU 40 provides coil 207 of solenoid 201 with electrical current to develop a force that acts on and moves plunger 202 toward a centering position with respect to coil 207. The force developed by the current supplied to coil 207 initially overcomes spring 164 and allows spring 130 to move face 118 into engagement with seat 62 to terminate communication between the front chambers 26,26' and the rear chambers 28,28'. Further movement of plunger 202 pulls face 159 away from atmospheric seat 114 to allow air to flow into the rear chamber 28,28' and begin the development of a pressure differential across walls 22,24. The resulting pressure differential acts on walls 22,24 and develops an operational force that overcomes return spring 240 and moves the walls 22,24. On initial movement of the hub 50 by this resulting operational force, push rod assembly 30 remains stationary as the cylindrical body 54 slides on key 150 until the engaging the bottom of slot 155 at which time plunger 302 on switch 300 is positioned on diameter 138 of plunger member 132 as illustrated in FIG. 4. As shown in FIG. 4, contact 306 is moved away from contact 308 and as a result a signal is sent to the ECU 40 to indicated the development of a second brake application. The resulting operational force provides output push rod 222 with an actuation force that moves pistons in the master cylinder 13 to pressurize fluid therein that is communicated to the wheel brakes under the direction of the ECU 40 to effect an appropriate brake application and attenuate the condition. The reaction disc 224 responds to the actuation force by providing a feedback through sleeve 250 to limit the movement of plunger 202 and thus a maximum actuation force is developed by the second input member. The ECU 40 receives current inputs from the various sensors in the vehicle and when the ECU 40 determines that the condition has abated, the ECU 40 terminates the communication of electrical current to coil 207 of the solenoid 201 and the return spring 170 acts on push rod assembly 30 to position control valve 100 in a manner as described above with respect to manual actuation wherein return spring 240 returns the walls 22,24 to a position of rest for a future brake application.

Further, during the operation of the brake booster 12 by the ECU 40, should an operator desire to effect a brake application, an input force applied to brake pedal 28 to push rod assembly 30 moves plunger member 132 such that plunger 302 is moved onto diameter 142 and contact 306 again engages contact 308 to close a circuit to provide ECU 40 with a signal indicating a manual brake application is desired. On engagement of contact 306 with contact 308 the ECU 40 terminates the communication of electrical current to coil 201 and the control of the vacuum brake booster is immediately transferred to the operator to complete the manual brake application.

The functional operation of the brake booster 12A is similar to that of brake booster 12, in that the control valve assembly 600 may be activated by either a manual input applied to a first plunger 432 to effect a first brake application or an electrical input applied to a solenoid 610 by an ECU to effect a second brake application.

Figure 6:
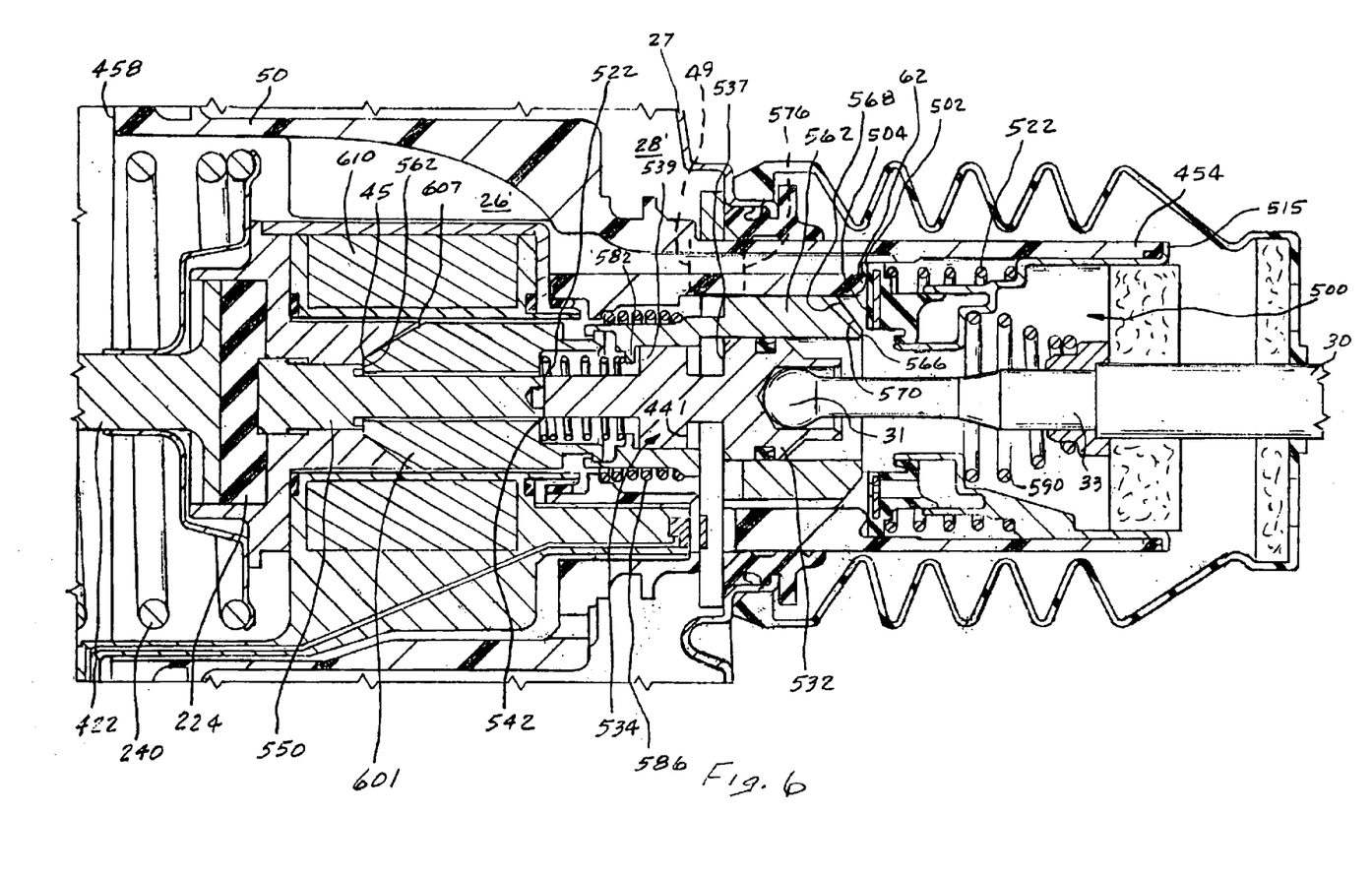
FIG. 6 is a sectional view of the hub and control valve of FIG. 5 in a power assist mode of operation in response to a manual input.

During a first brake application of brake booster 12A as illustrated in FIG. 5, the control valve assembly 500 is moved such that the shoulder 539 on the third land 540 of the first plunger 432 engages rib 582 to move atmospheric seat 570 away from face 502 while at the same time spring moves face 502 against seat 62 to terminate communication between chambers 26,26' and chambers 28,28 and thereafter allow air to enter into chamber 28,28 to create a pressure differential across wall 40. The pressure differential acts on wall 40 and is carried through hub 50 by way of reaction disc 224 to act on push rod 422 and move pistons in master cylinder 13 to effect a brake application. The reaction force developed in reaction disc 224 is carried through the end of the second shaft 550 and into the and 542 of the first shaft 536 to oppose the input force applied to push rod 33. When the reaction force exceeds the input force, the reaction force moves the first plunger 432 such that the second spring 586 repositions the second cylindrical member 562 and atmospheric seat 570 is positioned on face 502 to terminate communication of air to the second chamber 28, as shown in FIG. 6. To terminate this first brake application, the input force on push rod 33 is terminated and spring 590 acts on push rod 33 and with spring 586 holding the second atmospheric seat 570 on cylindrical member 562 against face 502 of the first cylindrical member 501, face 502 is moved away from vacuum seat 62 to allow the pressure in the rear chamber 28,28 to equalize with the pressure in chamber 26,26'. Thereafter, return spring 240 acts on the hub 50 to move the wall 40 toward the rear chamber 28,28' such that when key 150 engages the wall of the rear shell 27 and when face on the third land 542 engages key 150 the movement the first plunger 432 stops while the cylindrical body 454 continues until the bottom of slot 49,49' engages key 150 to define the rest or first mode of operation for the vacuum booster 12A as illustrated in FIG. 5.

Figure 7:
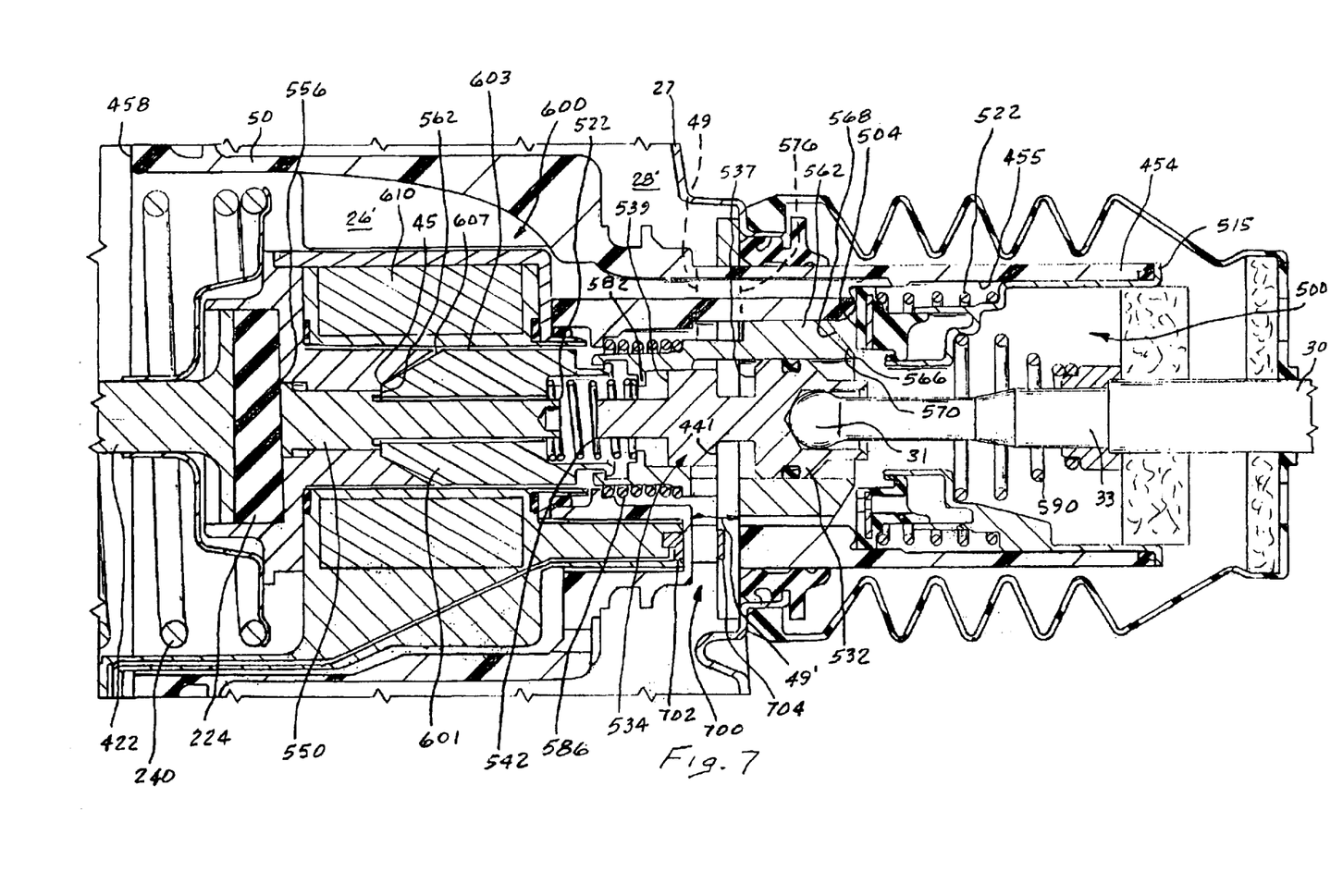
FIG. 7 is a sectional view of the hub and control valve of FIG. 5 in an automatic mode of operation under the control of an ECU.

When the ECU 40 determines that a second brake application is desirable to maintain a desired operation of the vehicle, the ECU 40 sends an electrical signal to solenoid 610 and to sensor 702 in switch 700. The electrical signal energized the coil in solenoid 610 to center the cylindrical member 562 of the second plunger and in doing so moves the atmospheric seat 570 away from face 502 on the first cylindrical member 501 such that air may enter the second chamber 28,28' and create a pressure differential across wall 40. The pressure differential acts on wall 40 and after overcoming return spring 240 moves hub 50 and sensor 702 away from exciter 704 that remains against the wall of the rear shell 27 by way of the force of spring 590 acting on the first plunger 432. As sensor 702 moves away from exciter 704 a first signal is supplied to the ECU 40 indicating that a second brake application has been initiated as confirmed by the movement of wall 40. This relationship between the sensor 702 and exciter 74 remains constant and continues during this second brake application that is under the control of the ECU 40 until sensor associated with measuring the operation of the vehicle indicate a safe operation may be achieved. Should an operator desire to effect a first brake application of the vehicle during this second brake application, a manual input is applied to push rod 33 and after overcoming the force of spring 590 to move face 537 on the land 536 into engagement with key 150 and move key 150 in slot 49,49' to position exciter 704 adjacent sensor 702 to create a second signal that is communicated to the ECU 40 indicating an operator desires to take control of the braking of the vehicle. Once the ECU 40 receives this second signal, the electrical input to the coil of the solenoid 610 is immediately terminated and the braking of the vehicle is under the control of the first input member as a function of the force applied to the input push rod 33.

While the functional operation of brake boosters 12 and 12A are similar, the structural components included in brake booster 12A are more compact and therefor offer a advantage to a manufacturer as installation space available under the hood and engine compartment of a vehicle is limited.

We claim:

1. A brake booster (12) having a housing with an interior separated into at least a first chamber (26,26') and a second chamber (28,28') by a wall (21) connected to a hub (50), said hub (50) having a cylindrical body (54) with an axial bore (55) that extends from a first end (56) to a second end (58), a control valve (100) located in said axial bore (55) for sequentially connecting said first chamber (26,26') with said second chamber (28,28') to provide for the equalization of fluid pressure therein in a first mode of operation and interrupting communication between said first (26,26') and second (28,28') chambers while connecting second chamber (28,28') to a surrounding environment to allow air to enter into said second chamber (28,28') and create a pressure differential across said wall (21) in response to an operational signal to defining a second mode of operation, said pressure differential acting on said wall (21) to develop an output force that is communicated through said hub (50) to an output push rod (222), said output force, after overcoming a return spring (240), moving said output push rod (222) to supply pistons located in a master cylinder (13) with an operational input to pressurize fluid in the master cylinder (13), said pressurized fluid from the master cylinder (13) being communicated to wheel brakes (14,14'18,18') to effect a brake application, said brake booster (12) being characterized by a first input member (30) connected to said control valve (100) and responsive to an operator input for moving said control valve (100) from said first mode to said second mode to develop a corresponding first brake application, a second input member (200) being connected to said control valve (100) and responsive to an electrical input under the control of an electronic control unit (ECU)(40) for moving said control valve (100) from said first mode to said second mode to develop a corresponding second brake application and switch means (300) responsive to movement of said control valve (100) by said second input member (200) to provide said ECU (40) with a first signal confirming the development of said second brake application and responsive to movement of said control valve (100) by said first input member (30) to provide said ECU (40) with a second signal whereby said electrical input to said second input member (200) is terminated and immediate development of said first brake application is initiated, said control valve (100) having a poppet assembly (101) with a flexible tubular section (102) secured to a collar assembly (108) to define a unitary structure, said tubular section having a bead (104) on a first end that is secured to said cylindrical body (54) by a first retainer (120) that is fixed to said cylindrical body (54) and a lip (106) on a second end that is secured to a collar (108) assembly, said collar assembly (108) having a flange (110) on a first end and a second end that is secured to said second end of said flexible tubular section (102), said control valve (100) having a washer (112) that is integral with said, lip (106) and a first annular surface (114) on said lip (106) that defines a first seat while said collar assembly (108) has a second annular surface (118) thereon that defines a first face, said control valve (100) including a first spring (130) that is located between said first retainer (120) and said washer (108) for urging said second annular surface (118) on said collar assembly (108) toward a second seat (62) in said cylindrical body (54), said control valve (100) having a first plunger (132) with a shaft that extends from a base on a first end (136) to a second end (140), said base having a stepped bore (152) therein for receiving a head (31) on a push rod (30) of said first input member, said shaft having a first diameter (134) for said base, a second diameter (138) adjacent said second end (140) and a third diameter (142) located there between, a cylindrical member (154) that surrounds said base of said shaft having a third annular surface (166) thereon that defines a second face (159), and a second spring (164) that is located in said stepped bore (152) of said base for urging said second face (159) away from said first end (136) of said shaft and toward said first seat, a third spring (170) that is located between said first retainer (120) and said push rod (30) for urging said first plunger (132) toward said first retainer (120) to bring said second face (159) into engagement with said first seat while moving said second annular surface (118) away from said second seat (62) during said first mode of operation, said second input member (200) having a second plunger (202) that surrounds said third diameter (142) on said shaft of said first plunger (132), a solenoid (201) that is concentric to said second plunger (202) and linkage (400) that connects said second plunder (202) with said cylindrical member (156) that surrounds said base of said first plunger (132), said solenoid (201) on receipt of said electrical input acting on and moving said second plunger (202) within said axial bore (55) and correspondingly moving said cylindrical member (156) and said second face on said third annular surface (166) away from said first seat after said first spring (130) moves said second face on said second annular surface (118) on said collar into engagement with said second seat (62) to allow air to be communicated to said second chamber (28,28') and initiate development of said second brake application during said second mode of operation, said second input member (200) in developing said second mode of operation moving said hub (50) while said first plunger (132) initially remains stationary such that a switch plunger (302) on said switch means (300) is located on said second diameter (138) of said shaft to provide said first signal to said ECU.

2. The brake booster as recited in claim 1 further characterized by a key (150) that extends through said cylindrical body (54) and engages said first plunger (132) to limit the axial movement of said first plunger (132) within said axial bore (55) and which engages said housing (153) to define a rest position for said first plunger (132) in said first mode of operation.

3. The brake booster as recited in claim 1 wherein said first input member (30) moves said first plunger (132) to bring said third diameter (142) on said shaft into contact with said switch plunger (302) on said switch means (300) to provide said second signal to said ECU.

4. A brake booster having a housing separated into at least a first chamber and a second chamber by a wall connected to a hub, said hub having a cylindrical body with an axial bore that extends from a first end to a second end, a control valve located in said axial bore for sequentially connecting said first chamber with said second chamber to provide for the equalization of fluid pressure therein in a first mode of operation and interrupting communication between said first and second chambers while connecting said second chamber to a surrounding environment to allow air to enter into said second chamber and create a pressure differential across said wall in response to an operational signal to defining a second mode of operation, said pressure differential acting on said wall to develop an output force that after overcoming a return spring, moves a output push rod to pressurize fluid in a master cylinder to effect a brake application, said brake booster being characterized by a first input member connected to said control valve and responsive to an operator input for moving said control valve from said first mode to said second mode to develop a corresponding first brake application, a second input member being connected to said control valve and responsive to an electronic control unit for moving said control valve from said first mode to said second mode to develop a corresponding second brake application and switch means responsive to movement of said wall by a pressure differential created by said second input member moving said control valve to provide an ECU with a first signal confirming the development of said second brake application and thereafter responsive to movement of said control valve by said first input member to provide said ECU with a second signal whereby an electrical input to said second input member is terminated and said first brake application is under the control of an operator, said control valve valve is characterized by:

a poppet assembly having a flexible tubular member that is secured to a collar to define a unitary structure, said unitary structure including a bead on said flexible tubular member that is fixed to said cylindrical body by a first retainer, a lip on said flexible tubular member and a flange on said collar, said lip having a first annular surface that defines a first seat while flange has a second annular surface thereon that defines a first face;

a first spring that is located between said first retainer and said lip for urging said second annular surface toward a second seat in said cylindrical body;

a first plunger having a shaft that extends from a base on a first end to a second end, said base having a stepped bore therein for receiving a head on a push rod of said first input member, said shaft having a first diameter for said base, a second diameter adjacent said second end and a third diameter located there between, a cylindrical member that surrounds said base of said shaft having a third annular surface thereon that defines a second face;

a second spring that is located in said stepped bore of said base for urging said second face away from said first end of said shaft and toward said first seat, a third spring that is located between said first retainer and said push rod for urging said first plunger toward said first retainer to bring said second face into engagement with said first seat while moving said second annular surface away from said second seat during said first mode of operation;

a second plunger that surrounds said third diameter on said shaft of said first plunger;

a solenoid that is concentric to said second plunger; and linkage that connects said second plunder with said cylindrical member that surrounds said base on said first plunger, said solenoid on receipt of said electrical input acting on and moving said second plunger within said axial bore and correspondingly moving said cylindrical member and said second face on said third annular surface away from said first seat after said first spring moves said second face on said second annular surface on said collar into engagement with said second seat to allow air to be communicated to said second chamber and initiate development of said second brake application during said second mode of operation, said second input member in developing said second brake application moving said hub while said first plunger initially remains stationary such that a switch plunger on said switch means is located on said second diameter of said shaft to provide said first signal to said ECU.

5. A brake booster having a housing with an interior separated into at least a first chamber and a second chamber by a wall connected to a hub, said hub having a cylindrical body with an axial bore that extends from a first end to a second end with a control valve assembly located therein for sequentially connecting said first chamber with said second chamber through a first passage to provide for the equalization of fluid pressure therein in a first mode of operation and interrupting communication through said first passage while connecting said second chamber to a surrounding environment through a second passage to allow air to enter said second chamber and create a pressure differential across said wall in response to an operational signal in a second mode of operation, said pressure differential acting on said wall to develop an output force that after overcoming a force of a return spring is transmitted through said hub to an output push rod that moves pistons located in a master cylinder to pressurizes fluid that is communicated to wheel brakes to effect a brake application, said brake booster being characterized by a first input member that is connected to said control valve assembly and responsive to an operator input for moving said control valve assembly from said first mode of operation to said second mode of operation to develop a first brake application, a second input member that is connected to said control valve assembly and responsive to an electrical input under the control of an electronic control unit for moving said control valve from said first mode of operation to said second mode of operation to develop a second brake application and switch means initially responsive to movement of said hub in said second mode of operation by said second input member for providing an ECU with a first signal confirming the development of said second brake application and thereafter responsive to movement of said control valve assembly by said first input member to provide said ECU with a second signal whereby said second brake application is immediately terminated and said first brake application is initiated, said control valve being characterized by:

a first cylindrical member that is sealingly located in said axial bore, said first cylindrical member having an annular face thereon that defines an vacuum seat;

a retainer fixed to said cylindrical body of said hub and sealingly engaging said first cylindrical member;

a first spring located between said retainer and said first cylindrical member for urging said annular face toward a first seat associated with said first passage in said hub;

first plunger means including a first shaft and a second shaft, said first shaft having a first diameter adjacent a first end and a second diameter adjacent a second end with a third diameter located there between to define a groove between said first and third diameters, said first end of said first shaft having a bore for receiving a head on a push rod of said first input member, said second shaft having a first end that contacts said second end of said first shaft and a second end that contacts a reaction disc associated with said output push rod;

a second cylindrical member having a stepped bore that surrounds said first and third diameters of said first shaft, a first end with a face thereon that defines an atmospheric seat, a second end with a lip thereon, a first shoulder located on its peripheral surface and a second shoulder in said stepped bore adjacent said second end;

a second spring that is located in said axial bore and engaging said first shoulder on said second cylindrical member for urging said first end and said second seat thereon toward said annular face on said first cylindrical member;

a key retained in a slot in said cylindrical body of said hub with first and second legs that extend past the peripheral surface of said cylindrical body, said first and second legs being located in said groove between said first and third diameters of said first shaft of said first plunger means to limit the axial movement of said first plunger means to a linear distance corresponding to said slot, said return spring acting on said hub to bring said key into engagement with a stop on said housing in said first mode of operation;

a third spring that is located between said retainer and said push rod for urging said first plunger means toward said retainer to allow said second spring to move said second seat on said first end of said second cylindrical member into engagement with said annular face on said first cylindrical member such that said first passage is in communication with said second passage in the first mode of operation;

a second plunger means including a cylindrical body that surrounds said second shaft of said first plunger means, said cylindrical body of said second plunger means having a groove for receiving said lip through which said cylindrical body is connected to said second cylindrical member;

a solenoid that is concentric to said cylindrical body of said second plunger means, said solenoid on receipt of said electrical input functioning as said second input member to provide force for moving said cylindrical body of said second plunger within said axial bore of said hub and correspondingly moving said first end and said second seat on said second cylindrical member away from said annular face on said first cylindrical member after said first spring moves said annular face into engagement with said first seat to terminate communication between said second chamber and said first chamber through said first passage and thereafter allow air to be communicated to said second chamber through said second passage to initiate said second mode of operation and effect said second brake application; and a switch having a sensor retained in said hub and an exciter element attached to said key, said sensor moving with said hub and away from said exciter elenent as said key and said first plunger remain stationary with respect to said hub in said second mode of operation during said second brake application, said movement of said sensor away from said exciter element creating and sustaining said first signal until an input force from said first input member acts on said first plunger to move said key and position said exciter element adjacent said sensor to develop said second signal whereby said ECU terminates said electrical input to said solenoid and the development of said first brake application as a function of a manual input.

6. The brake booster as recited in claim 5 wherein the development of said first signal by movement of said hub only occurs when said electrical signal is supplied to said solenoid said ECU.

7. The brake booster as recited in claim 6 wherein said exciter element is a magnetic chip carried by said key.

8. The brake booster as recited in claim 7 wherein only second shaft receives a reaction force to oppose the actuation force developed by the solenoid during a second brake application.

9. A brake booster having a housing with an interior separated into a first chamber and a second chamber by a wall that is connected to a hub, said hub having a cylindrical body with an axial bore therein for receiving a control valve assembly that sequentially connects said first chamber with said second chamber through a first passage in the hub to provide for the equalization of fluid pressure therein in a first mode of operation and interrupts communication through said first passage while connecting said second chamber to a surrounding environment through a second passage to allow air to enter said second chamber and create a pressure differential across said wall in a second mode of operation, said pressure differential acting on said wall to develop an output force, that after overcoming a force of a return spring, is transmitted through said hub to an output push rod for moving pistons located in a master cylinder to pressurizes fluid that is communicated to wheel brakes to effect a brake application, said brake booster being characterized by a first input member that is connected to said control valve assembly and responsive to a first force supplied by an input member for moving said control valve assembly from said first mode of operation to said second mode of operation to develop a first brake application, a second input member that is connected to said control valve assembly and responsive to a second force derived from a solenoid under the control of an electronic control unit for moving said control valve assembly from said first mode of operation to said second mode of operation to develop a second brake application and switch means initially responsive to movement of said hub in the development of said second mode of operation by said second input member for providing an ECU with a first signal confirming the development of said second brake application and later responsive to movement of said control valve assembly by said first input member for providing said ECU with a second signal whereby said second brake application is terminated and said first brake application is initiated, said control valve being characterized by:

- a first cylindrical member that is sealingly located in said axial bore with an annular face thereon that defines a vacuum seat;
- a retainer fixed to said cylindrical body for sealingly retaining said first cylindrical member within said axial bore;
- a first spring located in said axial bore for urging said annular face toward a first seat associated with said first passage;
- first plunger means including a first shaft and a second shaft located in said axial bore, said first shaft having a groove located between a first end and a second end, said first end being connected to said first input member, said second shaft having an end that contacts said first shaft and an end that contacts a reaction disc associated with said output push rod;
- a second cylindrical member with a stepped bore that receives said first shaft and a face on a first end that defines an atmospheric seat, a second end with a lip thereon, a first shoulder located on its a peripheral surface and a second shoulder in said stepped bore adjacent said second end;
- a second spring located in said axial bore and engaging said first shoulder on said second cylindrical member for urging said first end and said atmospheric seat thereon toward said annular face on said first cylindrical member;
- a key retained in a slot in said cylindrical body of said hub with first and second legs located in said groove of said first shaft, said groove and slot limiting the axial movement of said first plunger means within the axial bore, said return spring acting on said hub to position said key and first plunger in a rest position in said first mode of operation;
- a third spring located between said retainer and said push rod for urging said first plunger means toward said retainer to allow said second spring to move said atmospheric seat on said second cylindrical member into engagement with said annular face on said first cylindrical member such that said first passage is in communication with said second passage in said first mode of operation;
- a second plunger means including a cylindrical body that surrounds said second shaft, said cylindrical body of said second plunger means being connected to said on said second cylindrical member;
- a coil that surrounds said cylindrical body of said second plunger means, said coil on receipt of said electrical input functioning as a solenoid to move said cylindrical body of said second plunger means to a center position within said coil and correspondingly moving said vacuum away from said annular face after said first spring moves said moves said annular face into engagement with said vacuum seat to terminate communication through said first passage and thereafter allow air to be communicated to said second chamber through said second passage to develop said second mode of operation and initiate said second brake application; and
- a switch having a sensor retained in said hub and an exciter element attached to said key, said sensor during said second brake application moving with said hub and away from said exciter element as said key and said first plunger means remain in a stationary position with said axial bore to create and sustain a first signal until an input force applied by an operator to said first input member moves said first plunger and said key to position said exciter element adjacent said sensor to create said second signal whereby said ECU terminates said electrical input to said coil and the control of said control valve assembly is switched to the first input member to thereafter develop of said first brake application.

* * * * *